(12) United States Patent
Kim

(10) Patent No.: US 8,924,020 B2
(45) Date of Patent: Dec. 30, 2014

(54) APPARATUS FOR CONTROLLING ROBOT AND CONTROL METHOD THEREOF

(71) Applicant: Samsung Electronics Co., Ltd., Suwon (KR)

(72) Inventor: Kyung Rock Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 87 days.

(21) Appl. No.: 13/756,703

(22) Filed: Feb. 1, 2013

(65) Prior Publication Data

US 2013/0204436 A1    Aug. 8, 2013

(30) Foreign Application Priority Data

Feb. 3, 2012    (KR) .................. 10-2012-0011214

(51) Int. Cl.
| | |
|---|---|
| *G06F 19/00* | (2011.01) |
| *G06F 17/00* | (2006.01) |
| *B25J 9/00* | (2006.01) |
| *B25J 9/16* | (2006.01) |
| *B25J 13/08* | (2006.01) |

(52) U.S. Cl.
CPC . *G06F 17/00* (2013.01); *B25J 9/00* (2013.01); *B25J 9/16* (2013.01); *B25J 13/08* (2013.01); *B25J 9/006* (2013.01); *Y10S 901/46* (2013.01)
USPC ........... 700/259; 700/258; 382/100; 382/103; 901/46; 345/420

(58) Field of Classification Search
CPC ........... G06T 2207/10028; G06T 2207/30244; G06T 7/0042; A61B 9/2203; A61B 2017/00207
USPC ............ 700/258, 259; 382/100, 103; 901/46; 345/420
See application file for complete search history.

(56) References Cited

U.S. PATENT DOCUMENTS

| | | | | |
|---|---|---|---|---|
| 8,116,519 | B2* | 2/2012 | Ng-Thow-Hing et al. ... | 382/103 |
| 8,401,225 | B2* | 3/2013 | Newcombe et al. .......... | 382/100 |
| 8,401,242 | B2* | 3/2013 | Newcombe et al. .......... | 382/107 |
| 8,543,240 | B2* | 9/2013 | Itkowitz et al. ............... | 700/258 |
| 8,570,320 | B2* | 10/2013 | Izadi et al. .................... | 345/420 |
| 8,587,583 | B2* | 11/2013 | Newcombe et al. .......... | 345/420 |
| 8,682,489 | B2* | 3/2014 | Itkowitz et al. ............... | 700/258 |
| 8,718,837 | B2* | 5/2014 | Wang et al. ....................... | 701/2 |
| 2004/0243281 | A1* | 12/2004 | Fujita et al. ................... | 700/245 |
| 2009/0080699 | A1* | 3/2009 | Ng-Thow-Hing et al. ... | 382/103 |

OTHER PUBLICATIONS

Maxwell et al., Alfred the Robot Waiter Who Remembers you, 1999, Internet, p. 1-12.*
Wahde et al., A Brief Review of Bipedal Robotics Research, 2002, Internet, p. 1-9.*

(Continued)

*Primary Examiner* — McDieunel Marc
(74) *Attorney, Agent, or Firm* — Staas & Halsey LLP

(57) ABSTRACT

An apparatus for controlling a robot capable of controlling the motion of the arm of the robot, and a control method thereof, the apparatus including an image obtaining unit configured to obtain a three-dimensional image of a user, a driving unit configured to drive an arm of the robot that is composed of a plurality of segments, and a control unit configured to generate a user model that corresponds to a motion of the joint of the user based on the three-dimensional image, to generate a target model having a length of the segment that varies based on the user model, and to allow the arm of the robot to be driven based on the target model.

19 Claims, 13 Drawing Sheets

(56) References Cited

OTHER PUBLICATIONS

Yamaguchi et al., Development of a Bipedal Humanoid Robot Control Method of Whole Body Cooperative Dynamic Biped Walking, 1999, IEEE, p. 368-374.*

Braunl, Improv and EyeBot Real-Time Vision on-board Mobile Robots, 1997, IEEE, p. 131-135.*

Yamaguchi et al., Development of a Bipedal Humanoid Robot Having Antagonistic Driven Joints and Three DOF Trunk, 1998, IEEE, p. 96-101.*

* cited by examiner

APPARATUS FOR CONTROLLING ROBOT AND CONTROL METHOD THEREOF

CROSS-REFERENCE TO RELATED APPLICATIONS

This application claims the benefit of Korean Patent Application No. 10-2012-0011214, filed on Feb. 3, 2012, in the Korean Intellectual Property Office, the disclosure of which is incorporated herein by reference.

BACKGROUND

1. Field

Embodiments of the present disclosure relate to an apparatus for controlling a robot, capable of controlling the motion of the arms of the robot, and a control method thereof.

2. Description of the Related Art

A robot is defined as a mechanical system configured to take a reaction or an action through a sensor that receives a control command or detects the surrounding atmosphere, and a humanoid is defined as a robot provided with the appearance that is similar to a body of a human being. The humanoid is configured to be controlled by using various algorithms in order to copy the action of a human and carry out a motion similar to that of a human, and as an example, a robot provided with a three-dimensional depth sensor installed thereto may recognize a motion of a user and perform an action according to the recognized motion of the user.

In a case when the robot recognizes the motion of the arm of a user, the robot may be able to recognize the motion of the arm of the user by modeling the arm of the user as a mechanism composed of a plurality of member from the shoulder to the wrist of the user. In addition, the typical methods of controlling the motion of the arms of the robot according to the motion of the user include a method of mapping the joint angle of each joint by analyzing the mechanical shape of the arm of the user so that the robot may be able to move in a similar posture to a particular posture of the user, and a method of mapping the end position by analyzing the motion of the user that interacts with a particular subject, based on the position of the end portion of the hand or the end portion of the arm of the user.

However, the method of mapping the joint angle of each joint, since the method is only focused on the posture of a user, is difficult to reconstruct the motion that interacts with a particular subject, and the method of mapping the end position of a user tends to focus on the interaction with a particular subject, and in a case when the length of the segment of the arm of the robot is different from the length of the segment of the arm a human being, the robot may move with a posture that is dissimilar with the posture of a human being.

SUMMARY

Therefore, it is an aspect of the present disclosure to provide an apparatus for controlling a robot configured to perform a modeling of the motion of a user by varying the length of the segment, and a control method thereof.

Additional aspects of the disclosure will be set forth in part in the description which follows and, in part, will be apparent from the description, or may be learned by practice of the disclosure.

In accordance with one aspect of the present disclosure, an apparatus of controlling a robot includes an image obtaining unit, a driving unit, and a control unit. The image obtaining unit may be configured to obtain a three-dimensional image of a user. The driving unit may be configured to drive an arm of the robot that is composed of a plurality of segments. The control unit may be configured to generate a user model that corresponds to a motion of the joint of the user based on the three-dimensional image, to generate a target model having a length of the segment that varies based on the user model, and to allow the arm of the robot to be driven based on the target model.

The control unit may be configured, at an initial position, to generate the target model such that the length of the segment of the target model is same as a length of the segment of the arm of the robot, and at a target position, to generate the target model such that the length of the segment of the target model is same as a length of a segment of an arm of the user.

The control unit may be configured to generate the target model such that the length of the segment of the target model varies according to a distance from a present position to the target position.

The control unit may be configured to generate the target model such that the length of the segment of the target model varies according to a ratio of a remaining operation time to an entire operation time.

The control unit may be configured to allow a position of a wrist joint of the robot to follow a position of a wrist joint of the target model.

The control unit may be configured to allow an elbow joint of the robot to be positioned at lines of intersection of a plurality of spheres, the spheres each having a shoulder joint or the wrist joint of the robot as a center thereof while having the length of the segment of the arm of the robot as a radius thereof.

The control unit may be configured in a way that a first direction vector, which is aimed to an elbow joint of the target model from a central position of a circle that is formed by lines of intersection of a plurality of spheres, the spheres each having a position of a shoulder joint or a wrist joint of the target model as a center thereof while having the length of the segment of the target model as a radius thereof, is coincided with a second direction vector aimed to the elbow joint of the robot from a central position of a circle that is formed by the lines of intersection of the plurality of spheres, the spheres each having the shoulder joint or the wrist joint of the robot as the center thereof while having the length of the segment of the arm of the robot as the radius thereof.

In accordance with another aspect of the present disclosure, a method of controlling a robot is as follows. A three-dimensional image of a user may be obtained. A user model that corresponds to a motion of a joint of the user may be generated based on the three-dimensional image. A target model having a length of a segment varied based on the user model may be generated. An arm of the robot composed of a plurality of segments may be driven based on the target model.

In the generating of the target model, at an initial position, the target model may be generated such that the length of the segment of the target model is same as a length of the segment of the arm of the robot, and at a target position, the target model may be generated such that the length of the segment of the target model is same as a length of a segment of an arm of the user.

In the generating of the target model, the target model may be generated such that the length of the segment of the target model varies according to a distance from a present position to the target position.

In the generating of the target model, the target model may be generated such that the length of the segment of the target model varies according to a ratio of a remaining operation time to an entire operation time.

In the driving of the arm of the robot, a position of a wrist joint of the robot may be allowed to follow a position of a wrist joint of the target model.

The method may be achieved by further performing follows. A position of an elbow joint of the robot that is provided at lines of intersection of a plurality of spheres may be determined, the spheres each having a shoulder joint or the wrist joint of the robot as a center thereof while having the length of the segment of the arm of the robot as a radius thereof.

In the determining of the position of the elbow joint of the robot, a first direction vector, which is aimed to an elbow joint of the target model from a central position of a circle that is formed by lines of intersection of a plurality of spheres, the spheres each having a position of a shoulder joint or a wrist joint of the target model as a center thereof while having the length of the segment of the target model as a radius thereof, may be allowed to be coincident with a second direction vector aimed to the elbow joint of the robot from a central position of a circle that is formed by the lines of intersection of the plurality of spheres, the spheres each having the shoulder joint or the wrist joint of the robot as the center thereof while having the length of the segment of the arm of the robot as the radius thereof.

In accordance with one aspect of the present disclosure, the driving of the arms of a robot may be performed to be natural and similar to the posture of a human being, since the motion of a user is modeled by varying the length of the segment and the motion of the arm of the robot is controlled based on the modeling result.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
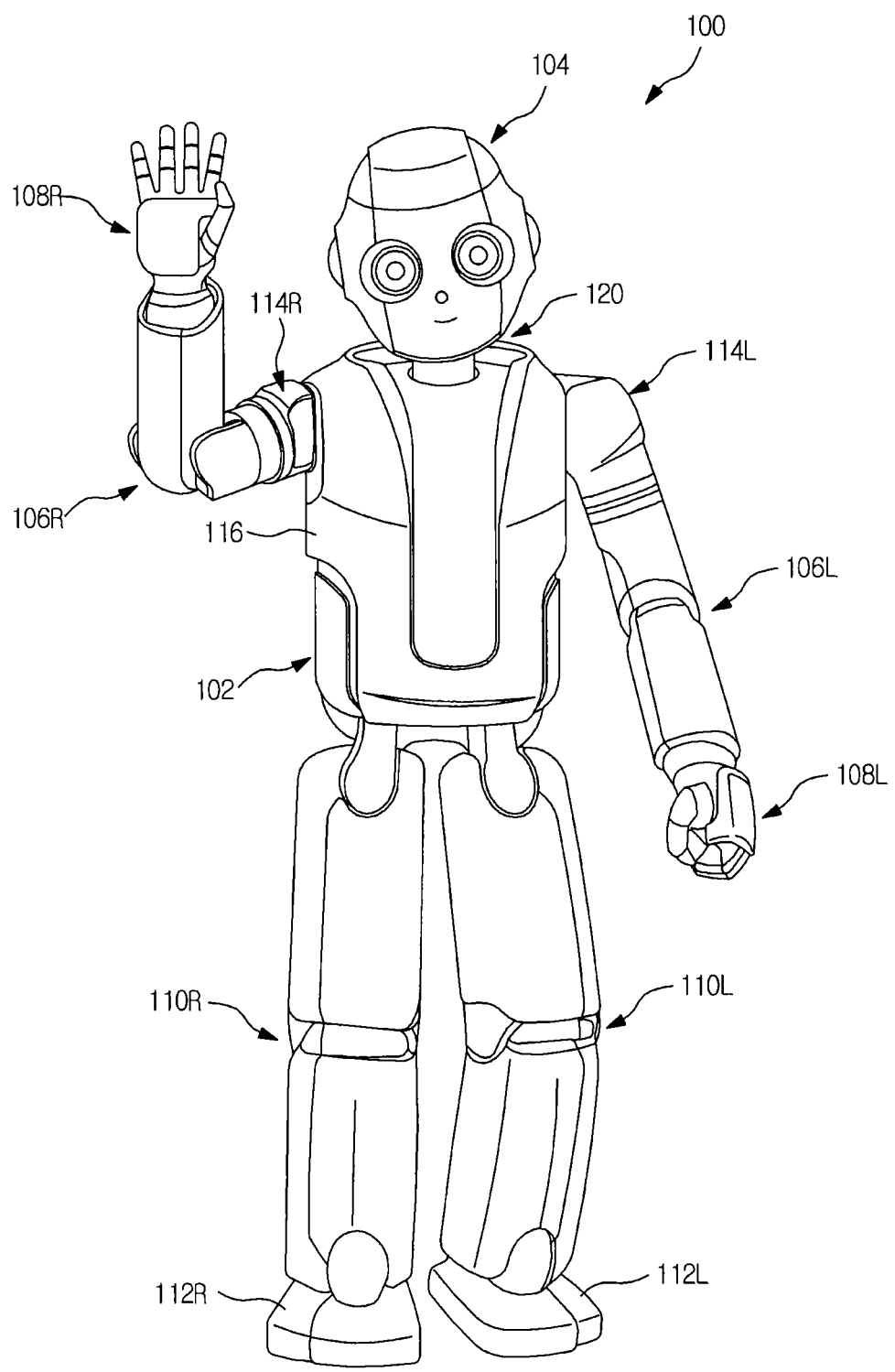
FIG. 1 is a drawing schematically illustrating a robot in accordance with one embodiment of the present disclosure.

Reference will now be made in detail to the embodiments of the present disclosure, examples of which are illustrated in the accompanying drawings, wherein like reference numerals refer to like elements throughout.

Figure 2:
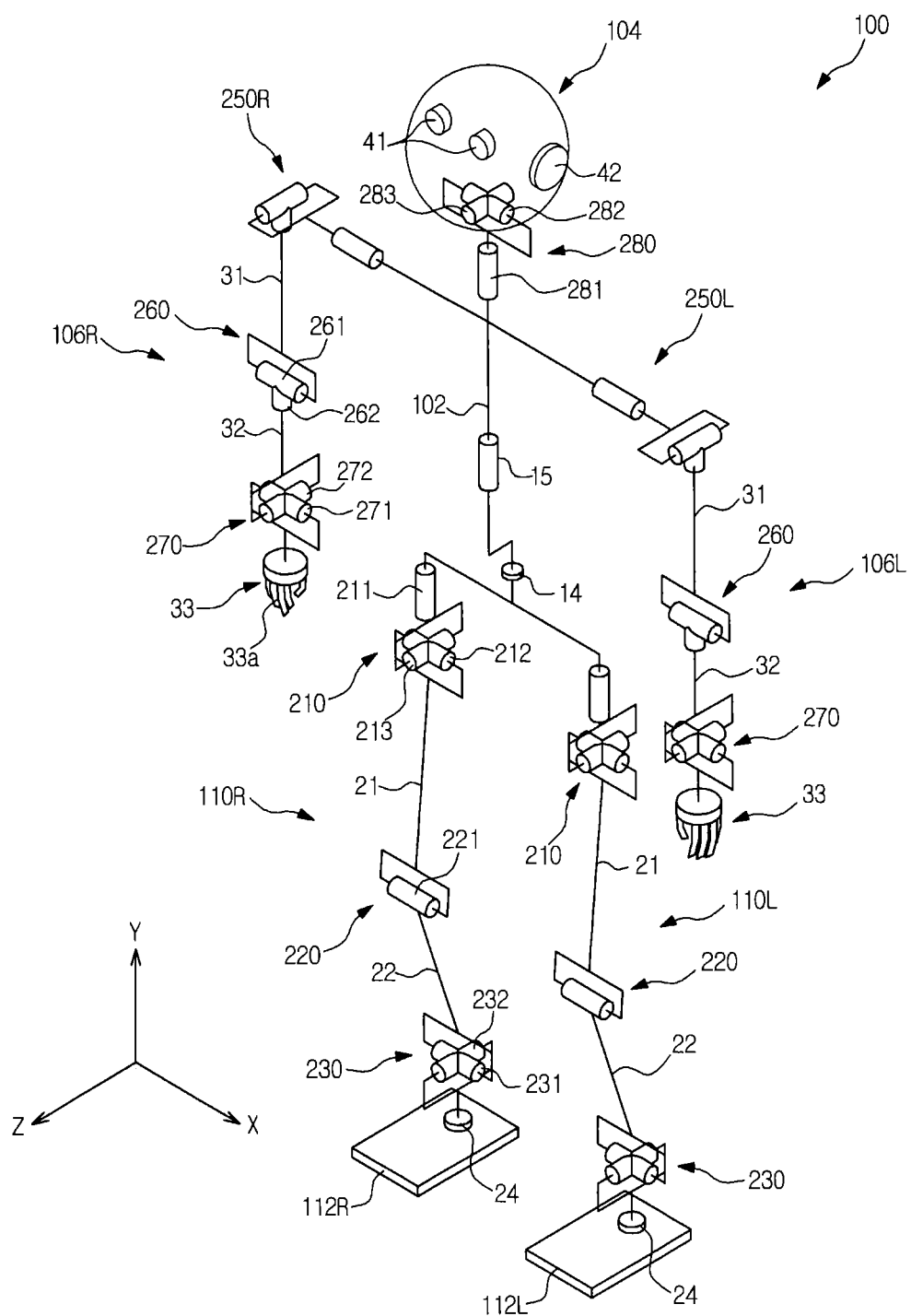
FIG. 2 is a drawing schematically illustrating the configuration of the joints of the robot of FIG. 1.

FIG. 1 is a drawing schematically illustrating a robot in accordance with one embodiment, and FIG. 2 is a drawing schematically illustrating a structure of the joints of the robot of FIG. 1.

Referring to FIG. 1, a robot 100 includes an upper body having a head, a torso, and arms, and a lower body having a plurality of legs.

The upper body of the robot 100 is composed of a torso 102, a head 104 connected at an upper portion of the torso 102 through a neck 120, two arms 106L and 106R connected at both sides of an upper portion of the torso 102 through shoulders 114L and 114R, and hands 108L and 108R connected to end portions of the two arms 106L and 106R, respectively. In addition, an inside the torso 102 of the upper body is protected by a cover 116.

The lower body of the robot 100 is composed of two legs 110L and 110R connected at both sides of a lower portion of the torso 102, and a foot 112L and a foot 112R connected to end portions of the two legs 110L and 110R, respectively.

Here, each of the head 104, the two arms 106L and 106R, the two legs 110L and 110R, the two hands 108L and 108R, and the foot 112L and the foot 112R is provided with a predetermined degree of freedom through joints.

With respect to the reference numerals, the "R" and the "L" refer to the right side and the left side of the robot 100, respectively.

By referring to FIG. 2, at the head 104 of the robot 100, a camera 41 to photograph the surroundings, and a microphone 42 in which the voice of a user is input are installed.

The head 104 is connected to the torso 102 of the upper body through a neck joint unit 280. The neck joint unit 280 is provided with three degrees of freedom by having a rotating joint 281 in a yaw direction (the Y-axis rotation), a rotating joint 282 in a pitch direction (the Z-axis rotation), and a rotating joint 283 in a roll direction (the X-axis rotation).

Each of the rotating joints 281, 282, and 283 of the neck joint unit 280 is connected to each of head-rotating motors (not shown).

Shoulder joint units 250L and 250R are mounted at both sides of the torso 102 of the upper body, and connect the two arms 106L and 106R to the torso 102 of the upper body.

Each of the two arms 106L and 106R is provided with an upper arm unit 31, a lower arm unit 32, and a hand 33.

The two upper arm units 31 are connected to the torso 102 through the shoulder joint units 250L and 250R, while the upper arm 31 and the lower arm unit 32 are connected to each other through an elbow joint unit 260, and the lower arm unit 32 and the hand 33 are connected to each other through a wrist joint unit 270.

The elbow joint unit 260 is provided with two degrees of freedom by having a rotating joint 261 in a pitch direction as well as a rotating joint 262 in the yaw direction, while the wrist joint unit 270 is provided with two degrees of freedom by having a rotating joint in a pitch direction 271 as well as a rotating joint 272 in the roll direction.

At the hand 33, the total of five fingers 33a are installed. At each of the fingers 33a, a plurality of joints (not shown) configured to be driven by motors may be installed. The fingers 33a are configured to grab an object according to the motion of the arm 106, or to perform various motions such as pointing at a particular direction.

At the torso 102 of the upper body, a rotating joint 15 in the yaw direction is installed so that the upper body may be rotated.

In between the chest and the waist composing the torso 102, the rotating joint 15 in the yaw direction is installed so that the chest may be rotated with respect to the waist.

At the torso 102 of the upper body, a pose sensor 14, which is configured to detect the inclining angle of the upper body with respect to a vertical axis and the angular velocity of the upper body, may further be installed.

The two legs 110L and 110R of the robot 100 each is provided with an upper leg unit 21 and a lower leg unit 22, and the leg 110L is provided with the foot 112L, while the leg 110R is provided with the foot 112R.

The upper leg unit 21 is connected to the torso 102 of the upper body through a hip joint unit 210, while the upper leg unit 21 and the lower leg unit 22 are connected to each other through a knee joint unit 220, and the lower leg unit 22 and each of the foot 112L and the foot 112R is connected to each other through an ankle joint unit 230.

The hip joint unit 210 is provided with three degrees of freedom. In more detail, the hip joint unit 210 is provided with a rotating joint 211 in the yaw direction (the Y-axis rotation), a rotating joint 212 in the pitch direction (the Z-axis rotation), and a rotating joint 213 in the roll direction (the X-axis rotation).

The knee joint unit 220 is provided with one degree of freedom by having a rotating joint 221 in the pitch direction.

The ankle joint unit 230 is provided with two degrees of freedom by having a rotating joint 231 in the pitch direction and a rotating joint 232 in the roll direction.

A Force and Torque Sensor (F/T sensor) 24 is installed between the foot 112L and the foot 112R and the ankle joint parts 230 on the legs 110L and 110R. The F/T sensor 24 detects an external force in a Z-axis direction exerted on the feet 112L and 112R of the robot 100.

Hereinafter, an apparatus for controlling a robot capable of naturally driving the legs 106L and 106R by controlling the motions of the arms 106L and 106R of the robot 100, and a control method thereof will be described in detail.

The apparatus for controlling the robot is configured to recognize the movement of a user based on a three-dimensional image of the user, and control the joints of the robot 100 so that the robot 100 may move by corresponding to the movement of the user that is recognized. The apparatus for controlling the robot may be built in at the robot 100 in the form of a module, or may be composed in the form of a remote control apparatus for a user to control the motion of the robot 100 from a remote location.

Figure 3:
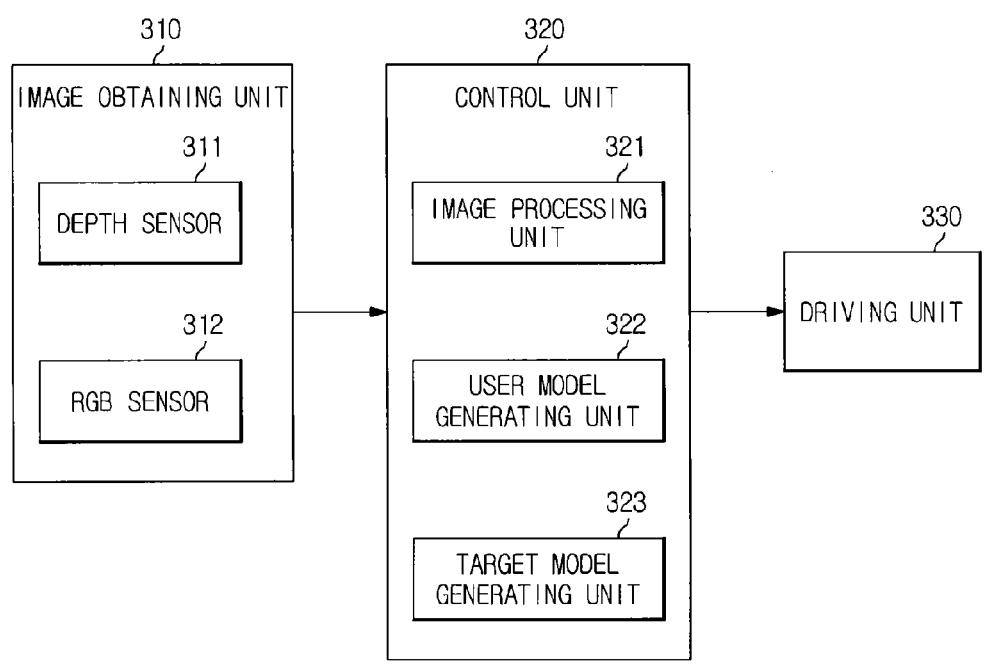
FIG. 3 is a drawing schematically illustrating the configuration of an apparatus for controlling of a robot in accordance with one embodiment of the present disclosure.
Figure 4:
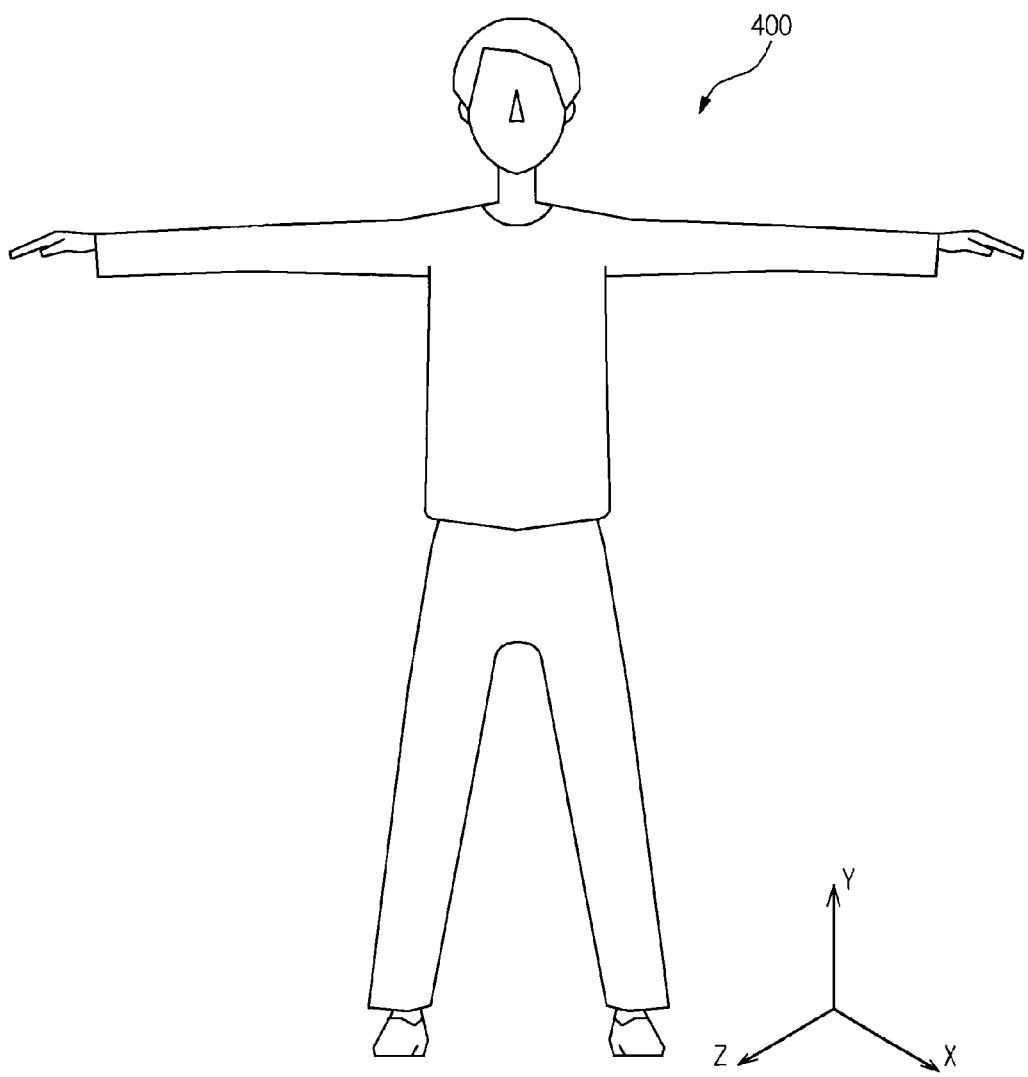
FIG. 4 is a drawing schematically illustrating a three-dimensional image of a user in accordance with one embodiment of the present disclosure.
Figure 5:
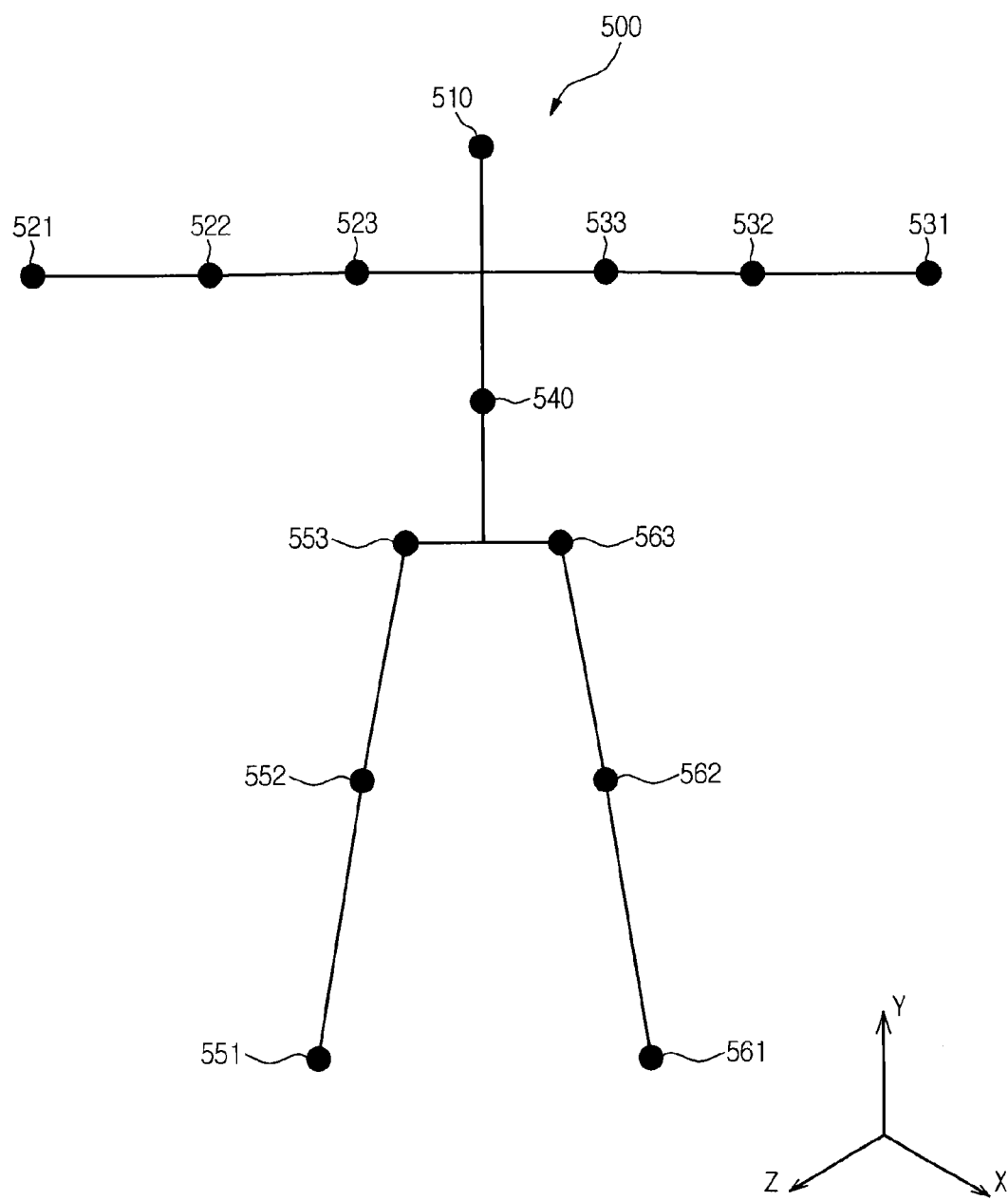
FIG. 5 is a drawing schematically illustrating a user model that is generated based on the three-dimensional image of FIG. 4.

FIG. 3 is a drawing schematically illustrating the configuration of a control apparatus of a robot in accordance with one embodiment, FIG. 4 is a drawing schematically illustrating a three-dimensional image of a user in accordance with one embodiment, and FIG. 5 is a drawing schematically illustrating a user model 500 that is generated based on the three-dimensional image of FIG. 4.

Referring to FIGS. 3, 4, and 5, the apparatus for controlling the robot includes an image obtaining unit 310, a control unit 320, and a driving unit 330.

The image obtaining unit 310 is configured to obtain a three-dimensional image of a user. For such, the image obtaining unit 310 includes a depth sensor 311 to obtain a depth image, and a RGB sensor 312 to obtain a color image. The depth sensor 311 measures a depth by transmitting infrared light and measuring the distance of the transmitted infrared light being returned after being reflected at an object. The RGB sensor 312 obtains a color image to detect the face or the head of a user.

The control unit 320 controls the motion of a robot based on the three-dimensional image of a user according to a control program that is pre-stored. For such, the control unit 320 includes an image processing unit 321, a user model generating unit 322, and a target model generating unit 323.

The image processing unit 321, in a case when the resolution of a depth image is lower than the resolution of a color image, matches the depth image to the color image. Meanwhile, in another embodiment of the present disclosure, in a case when a depth image and a color image are obtained by a same sensor, the matching of the depth image to the color image may be excluded.

In addition, the image processing unit 321 extracts a silhouette image based on a three-dimensional image. For example, the image processing unit 321 divides a three-dimensional image into a plurality of segments, and from the divided plurality of segments, a segment that corresponds to a target object 400 is detected. At this time, the image processing unit 321, in order to detect the target object 400 that corresponds to a human body, may use a face detection algorithm or a head detection algorithm based on learned data.

The user model generating unit 322 calculates the segments and the positions of the joints of the target object 400 by using a rectangle fitting algorithm based on a silhouette image. Then, the user model generating unit 322, based on the calculated segments and the calculated positions of the joints of the target object 400, generates a user model 500. For example, the user model 500 may be a skeleton model that corresponds to the motions of the joints of a user.

Meanwhile, a method of generating the user model 500 of the present disclosure is not limited to a particular embodiment, and various algorithms, which are configured to calculate the positions of the joints and the segments of the target object 400 based on a three-dimensional image, may be used. In addition, in order to generate the user model 500, by using a separate motion sensor, the positions of the joints and the segments of the target object 400 may be able to be calculated.

The target model generating unit 323, based on the user model 500, generates a target model having the lengths of the segments being varied. The detailed descriptions of the method of generating a target model will be described later on FIGS. 7 to 8.

The driving unit 330 is configured to drive a driving motor installed at each joint unit according to a control command of the control unit 320, thereby changing the position of each joint and the angle of each joint. At this time, the control command of the control unit 320 enables the angle of each joint of the arms 106L and 106R of the robot 100 to follow a target angle, or the position of each wrist joint unit 270 of the robot 100 to follow a target position.

Meanwhile, in a case when the apparatus for controlling the robot is composed of a remote control apparatus, the apparatus for controlling the robot, through wireless/cable networks, is connected to the robot 100 at a remote location, and may further include a communication unit configured to transmit a control signal of each joint unit.

The three-dimensional image may include a user portion corresponding to a target object 400, and a background portion. For example, the background portion may be a portion such as a wall or a floor. According to such, a process of separating the target object 400 from other object is needed, and by the image processing unit 321, a silhouette image is extracted based on a three-dimensional image.

Each pixel of the three-dimensional image is provided with an X coordinate, a Y coordinate, and a Z coordinate, which corresponds to a depth value. Only a pixel of a portion corresponding to the target object 400 is provided with a depth value in the silhouette image.

Based on the silhouette image, the positions of the joints and the segments of the target object 400 are calculated, and the user model 500 is obtained by modeling the positions of the segments and the joints of the torso portion, the arm portions and the leg portions based on the face portion or the head portion of the target object 400 according to the rectangle fitting algorithm.

With respect to the head portion of the user model 500, the position of the central point of the head portion of the user model 500 is determined as a feature point, and with respect to the torso portion, the arm portion, and the leg portion of the user model 500, the position of the joint to which each segment is connected, or the position of the end portion of each segment, is determined as a feature point.

In the embodiment of the present disclosure, with respect to the user model 500, the positions of the total of fourteen feature points are determined, and is modeled with the positions of a center of a head 510, a right shoulder joint 533, a right elbow joint 532, a right wrist joint 531, a left shoulder joint 523, a right elbow joint 522, a right wrist joint 521, a torso 540, a right pelvis joint 563, a right knee joint 562, a right ankle joint 561, a left pelvis joint 553, a left knee joint 532, a left ankle joint 532 and a left ankle joint 531.

Meanwhile, with respect to the user model 500, the number of the feature points is not limited to a particular embodiment, and more number of the feature points may be used by using an inverse kinematics algorithm.

Hereinafter, by performing a modeling of the motion of a user, for the sake of convenience, only the motion of a right arm of a user is modeled. However, with respect to the motion of a left arm, the same method may be applied. In addition, with respect to the user model 500, the target model and the robot, the lengths of the upper arm segments and the lengths of the lower arm segments of the user model 500 are assumed to be same, but the present disclosure is not limited thereto having the same lengths of the upper arm segments as the lower arm segment.

Figure 6:
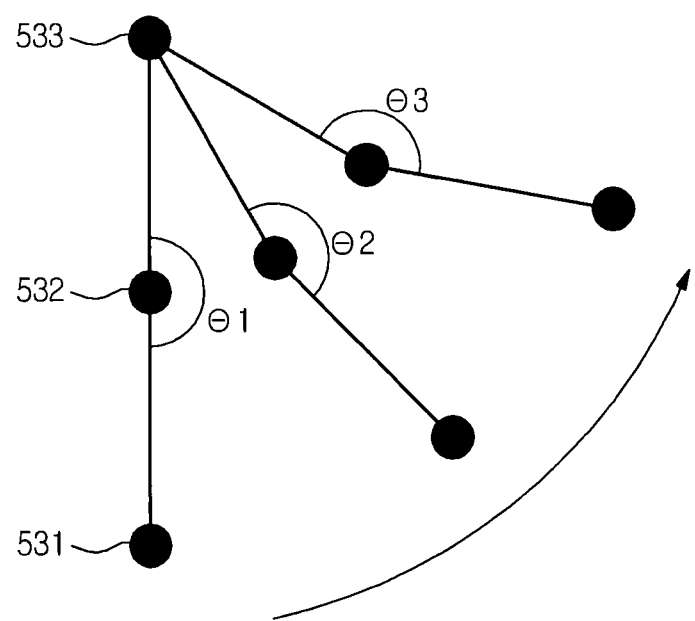
FIG. 6 is a drawing schematically illustrating the motions of the joints of a user model in accordance with one embodiment.

FIG. 6 is a drawing schematically illustrating the motions of the joints of a user model in accordance with one embodiment.

Referring to FIG. 6, in a case when the arm of the user model 500 is moved, the right wrist joint 531 of the user model 500 is moved from an initial position to a target position. At this time, assuming that the position of the right shoulder joint 533 of the user model 500 is fixed, the angle of the right elbow joint 532, to which the upper segment and the lower segment of the right arm of the user model 500 are connected, is changed to θ3 after passing through from θ1 to θ2.

Figure 7:
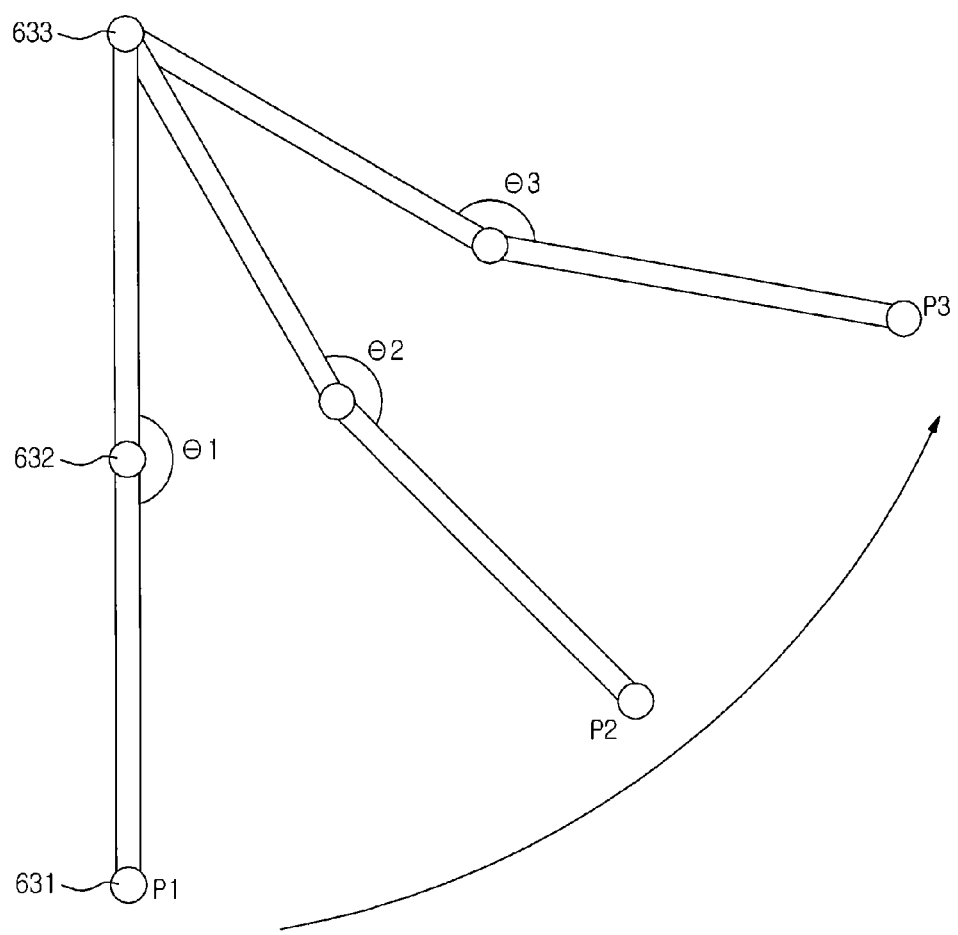
FIG. 7 is a drawing schematically illustrating a target model that follows the angles of the joints of the user model of FIG. 6.

FIG. 7 is a drawing schematically illustrating a target model that follows the angles of the joints of the user model of FIG. 6.

Referring to FIG. 7, the target model generating unit 323 generates the target model such that the length of the segment of the target model is same as the length of the segment of the arm of the robot 100. The target model generating unit 323 allows the angle of the joint of the target model to follow the angle of the joint of the user model 500.

According to such, although the length of the segment of the target model is different from the length of the segment of the user model 500, the angle of a right elbow joint 632 of the target model is changed to θ3 after passing through from θ1 to θ2 the same as the change of the angle of the right elbow joint 532 of the user model 500. According to such, by allowing the angle of the joint of the target model follow the angle of the user model 500, the motion of the arm of the robot 100, which will be described later, may be moved in a similar posture to the posture of a human being.

The position of a right wrist joint 631 of the target model, differently from the change of the position of the right wrist joint 531 of the user model 500, is changed to P3 after passing through from P1 to P2. Here, P1, P2, and P3 of the positions of the right wrist joint 631 are positioned on the plane surface on which the arm of the user model 500 move, and for example, P1, P2 and P3 each may have coordinates (10, 10), (30, 18), and (48, 36).

Figure 8:
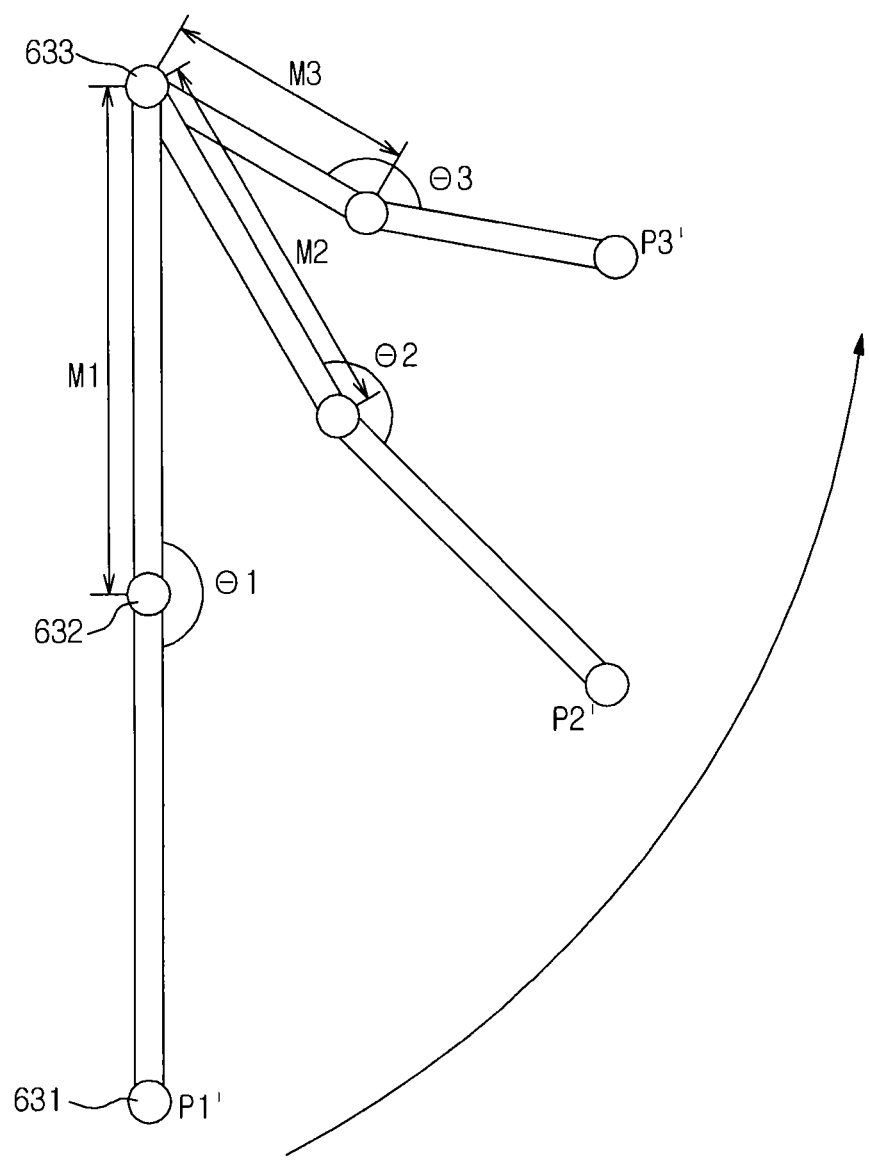
FIG. 8 is a drawing schematically illustrating the changes of the lengths of the segments of the target model of FIG. 7.

FIG. 8 is a drawing schematically illustrating the changes of the length of the segment of the target model of FIG. 7.

Referring to FIG. 8, the target model generating unit 323 generates the target model such that, at an initial position, the length of the segment of the target model is same as the length of the segment of the arm of the robot 100, and at a final target position, the length of the segment of the target model is same as the length of the segment of the arm of a user.

In more detail, at an initial position, the length M1 of the segment of the target model is same as the length N of the segment of the arm of the robot 100, and at a target position, the length M3 of the segment of the target model is same as the length L of the segment of the user model 500, and the length of the segment of the target model on a moving path is changed to a value between the M1 and the M2.

In addition, the target model generating unit 323 allows the angle of a right elbow joint 632 of the target model to follow the angle of the right elbow joint 532 of the user model 500 and thus to be changed to θ3 after passing through from θ1 to θ2.

According to such, the position of the right wrist joint 631, differently from the moment prior to the change of the length of the segment of the target model, is changed to P3' after passing through from P1' to P2'. For example, P1' may be (10, 10), P2' may be (25, 28), and P3' may be (27, 44).

The driving unit 330 performs the operation such that the wrist joint unit 270 of the right arm of the robot 100 follows the position of the right wrist joint 631 of the target model.

In this manner, as the motion of a user is modeled in accordance with one aspect of the present disclosure, the motion of the robot 100 is made to follow the angle of the joint of the user while having the posture of the user as a priority if the robot 100 is far from the target position, and the motion of the robot 100 is made to follow the position of the joint of the user while having the end position of the user as a priority if the robot 100 is close to the target position.

In accordance with one aspect of the present disclosure, when the position of the end portion of the hands of user or the position of the end portion of the arms of a user are mapped, at an initial stage, the motions of the arms of the robot 100 is moved in a similar posture to the posture of a human being, and at a final stage, the end position of the robot 100 is reached at the target position, so that the motion to interact with a particular subject may be performed.

More in detail, the target model generating unit 323, according to the mathematical formula below, by varying the length of the segment of the target model, the modeling of the motion of a user is performed:

The length of the segment of the target model=the length of the segment of the user model+$k$*(the length of the segment of the arm of the robot or the length of the segment of the arm of the user model)    Mathematical Formula Here, k=remaining operation time/entire operation time According to such, the target model generating unit 323 is configured to generate the target model such that the length of the segment of the target model is varied according to the distance from the present position of the wrist joint 631 of the target model to the target position of the right wrist joint 631 of the target model.

Figure 9:
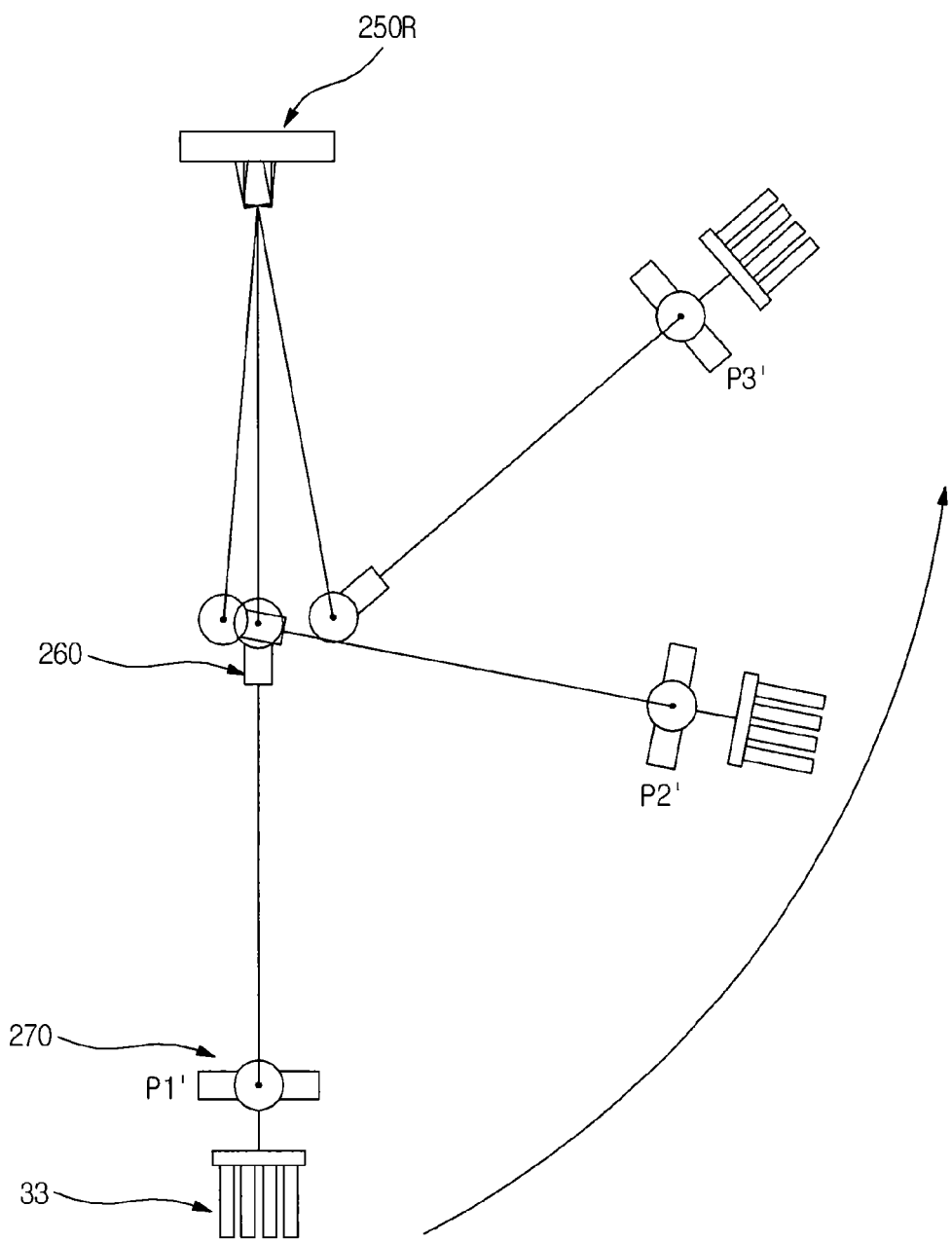
FIG. 9 is a drawing schematically illustrating the arm of the robot that follows the position of the wrist joint of the target model of FIG. 8.

FIG. 9 is a drawing schematically illustrating the arm of the robot that follows the position of the wrist joint of the target model of FIG. 8.

Referring to FIG. 9, the position of the wrist joint unit 270 of the arm of the robot 100, by following the position of the right wrist joint 631 of the target model, is changed to P3' after passing through from P1' to P2'. The angle of the elbow joint 260 of the robot 100, without following the angle of the joint of the target model, is changed to a proper angle according to the fixed position of the shoulder 250R of the robot 100 and according to the varying position of the wrist joint unit 270.

According to such, the motion of the arm of the robot 100 based on the target model, at an initial position, is similar to the posture of the robot 100, but the closer the robot 100 is to the target position, the more similar the posture of the robot 100 becomes to the posture of a human being.

Figure 10:
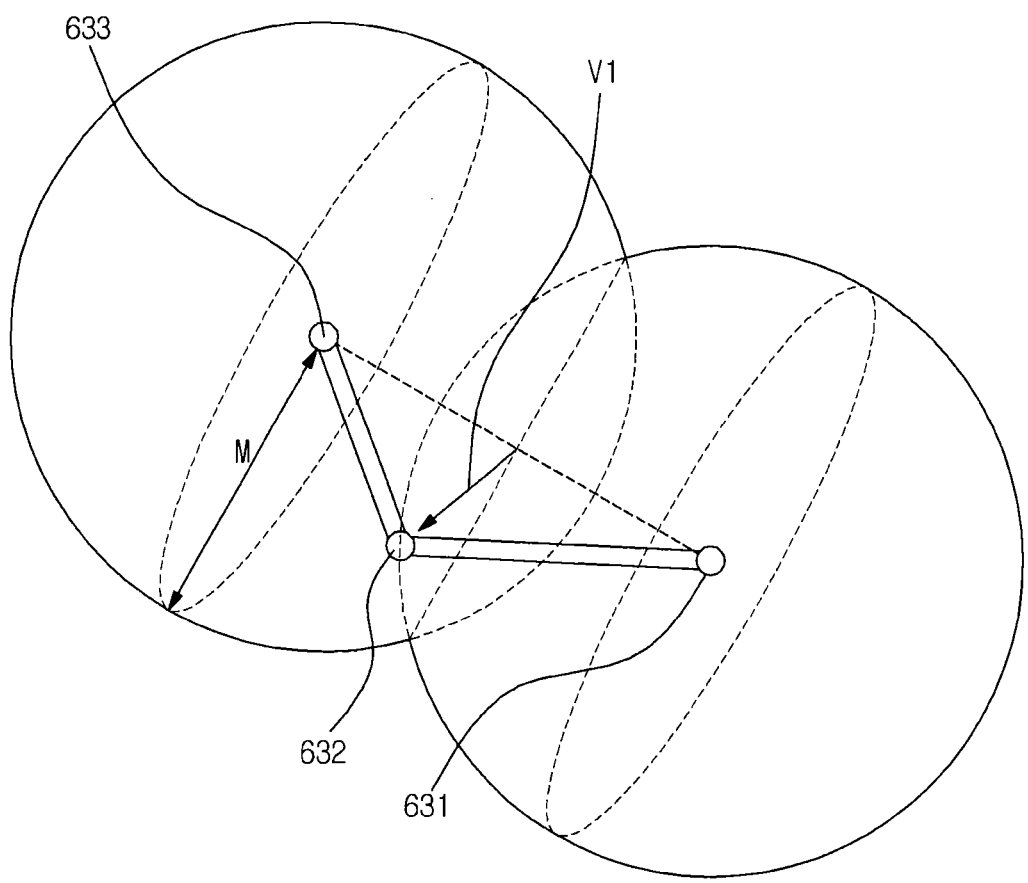
FIG. 10 is a drawing schematically illustrating the position of the elbow joint of the target model of FIG. 7.

FIG. 10 is a drawing schematically illustrating the position of the elbow joint of the target model of FIG. 7.

Referring to FIG. 10, the elbow joint 632 of the target model may be modeled as being positioned at lines of intersection of a plurality of spheres, each having the shoulder joint 633 or the wrist joint 631 of the target model as a center thereof while having the length of the segment of the arm of the target model as a radius thereof.

Here, since the elbow joint 632 of the target model may be positioned at any position along the tangent lines, the control unit 320, in order to specify the posture of the target model, may calculate a direction vector V1 aimed to the elbow joint 632 of the target model from a center of a circle formed by lines of intersection of the plurality of spheres, each having the shoulder joint 633 or the wrist joint 631 of the target model as a center thereof while having the length M of the segment of the arm of the target model as a radius thereof.

Figure 11:
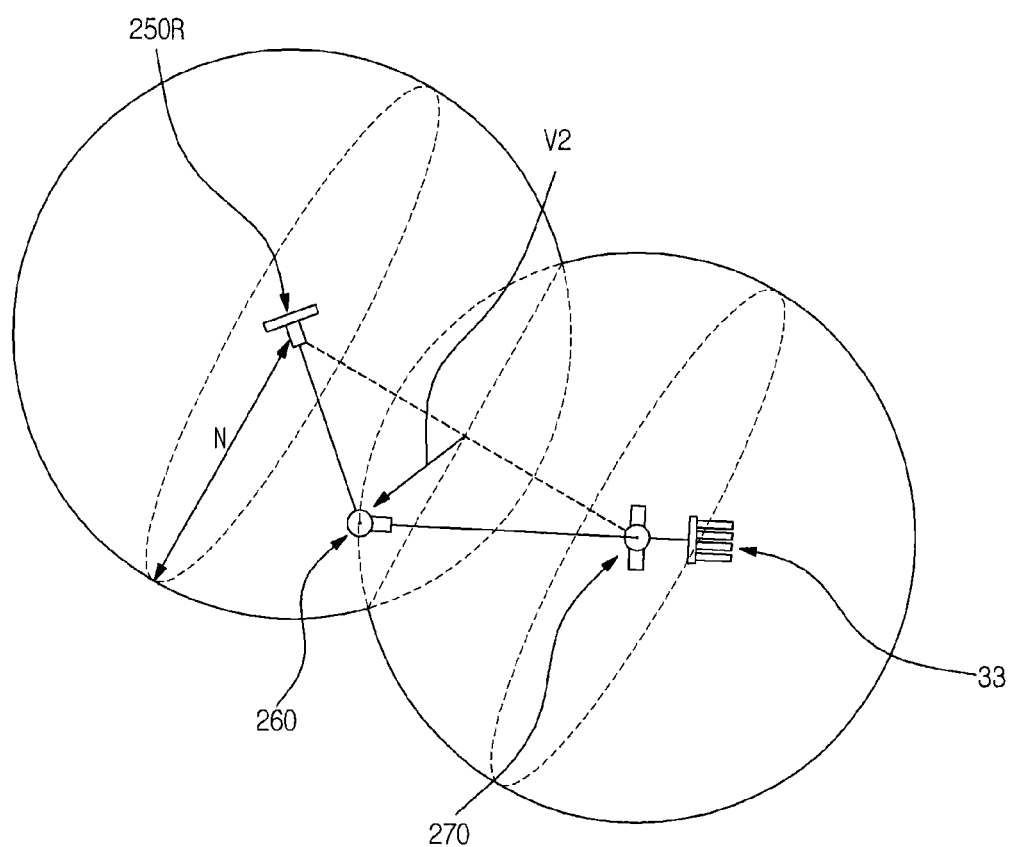
FIG. 11 is a drawing schematically illustrating the position of the elbow joint of the robot of FIG. 9.

FIG. 11 is a drawing schematically illustrating the position of the elbow joint of the robot of FIG. 9.

Referring to FIG. 11, even in a case of the arm of the robot 100 having the same positions of the shoulder joint unit 250R and the wrist joint unit 270 as those of the target model, the elbow joint unit 260 of the robot 100 may be positioned at various positions along the tangent lines of a plurality of spheres, each having the shoulder joint unit 250R or the wrist joint unit 270 of the robot 100 as a center thereof while having the length of the segment of the arm of the robot 100 as a radius thereof.

Here, the control unit 320, in order to specify the posture of the robot 100, may calculate a direction vector V2 aimed to the elbow joint unit 260 of the robot 100 from a center of a circle formed by the lines of intersection of the plurality of spheres, each having the shoulder joint unit 250R or the wrist joint unit 270 of the robot 100 as a center thereof while having the length of the segment of the arm of the robot 100 as a radius thereof.

The control unit 320, in order for the direction vector V1 and the direction vector V2 to be coincident with each other so that the posture of the arm of the robot 100 is similar to the posture of a user, determines the position of the elbow joint unit 260 of the robot 100. According to such, the posture of the robot 100 including the position of the elbow joint 260 of the robot 100 may move in a highly similar manner as the posture of a human being.

Figure 12:
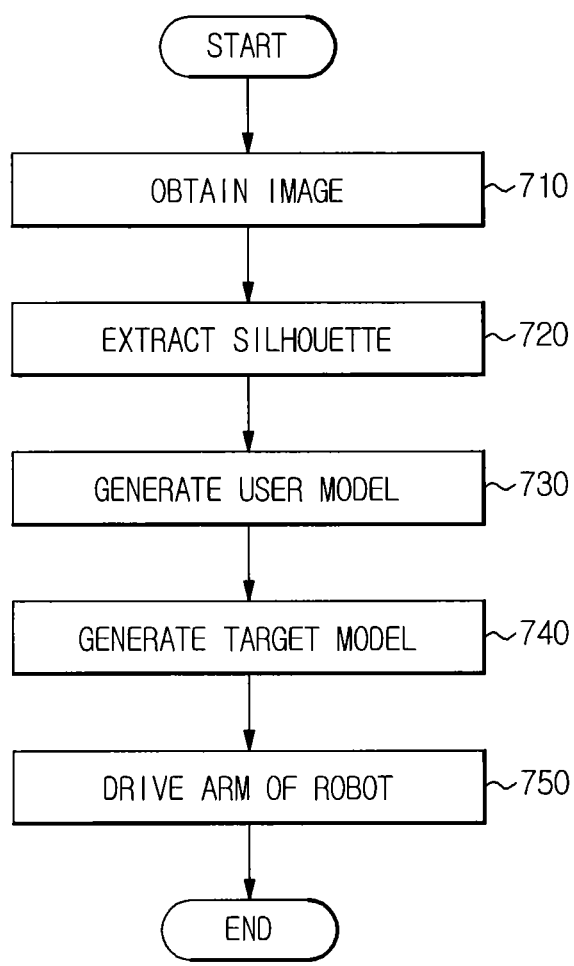
FIG. 12 is a flow chart schematically illustrating a control method of a robot in accordance with one embodiment of the present disclosure.

FIG. 12 is a flow chart schematically illustrating a method of controlling a robot in accordance with one embodiment of the present disclosure.

Referring to FIG. 12, the image obtaining unit 310 obtains a three-dimensional image of a user (710). The three-dimensional image of a user may be obtained by obtaining a depth image and a color image of the user from different sensors, or from a same sensor.

Next, the image processing unit 321, based on the three-dimensional image of the user, extracts a silhouette image (720). At this time, the image processing unit 321, by using a face detection scheme or a head detection scheme based on learned data, detects the target object 400, and may detect the segment that corresponds to the target object 400.

Next, the user model generating unit 322, based on the silhouette image, generates the user model 500 that corresponds to the motion of the joint of the user (730). Then, the generated user model 500 is provided based on the positions of the joints and the segments of the target object 400.

Next, the target model generating unit 323, based on the user model 500, generates the target model (740). The target model, first, is generated by following the angle of the joint of the user model 500. Then, the target model is provided with the length of the segment being varied, and at an initial position, the length of the segment of the target model is formed to be same as the length of the segment of the arm of the robot 100, and at a target position, the length of the segment of the target model is formed to be same as the length of the segment of the arm of the user.

Next, the driving unit 330, based on the target model, drives the arm of the robot 100 (750). According to such, the position of the wrist joint unit 270 of the arm of the robot 100 is driven by following the position of the wrist joint 631 of the target model.

Figure 13:
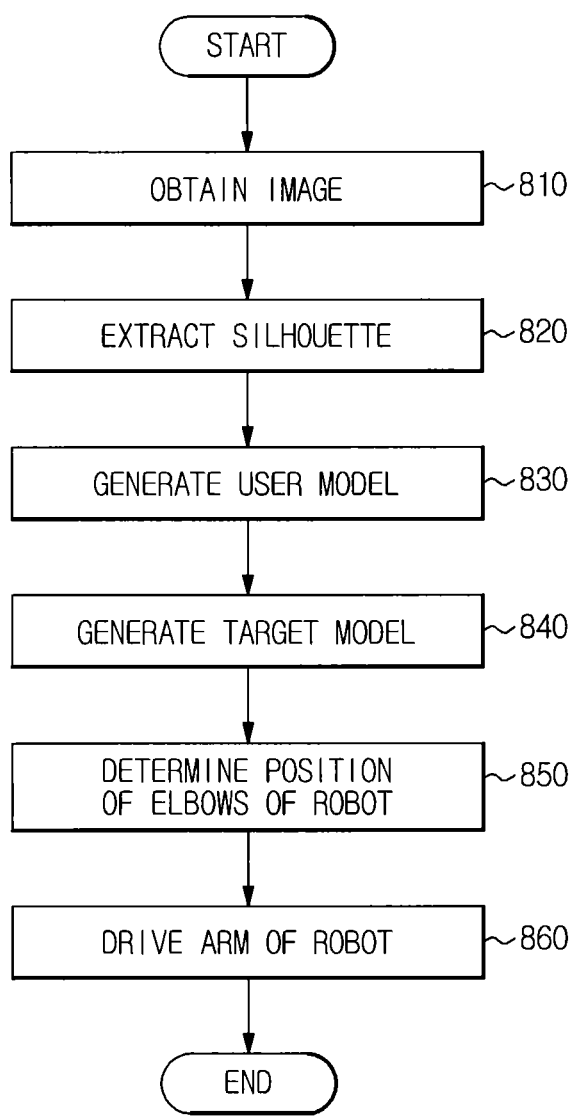
FIG. 13 is a flow chart schematically illustrating a control method of a robot in accordance with another embodiment of the present disclosure.

FIG. 13 is a flow chart schematically illustrating a method of controlling a robot in accordance with another embodiment. With respect to the descriptions that are overlapping with the descriptions of FIG. 12, the detailed descriptions will be omitted.

Referring to FIG. 13, the control unit 320, prior to the arm of the robot 100 being driven, determines the position of the elbow joint unit 260 of the robot (850). The position of the elbow joint unit 260 of the robot 100 is determined in a way that the direction vector V1, which is aimed to the elbow joint 632 of the target model from the central position of the circle that is formed by lines of intersection of the plurality of spheres, each having a position of the shoulder joint 633 or the wrist joint 631 of the target model as a center thereof while having the length of the segment of the target model as a radius thereof, is coincided with the direction vector V2 aimed to the elbow joint unit 260 of the robot 100 from the central position of the circle that is formed by the lines of intersection of the plurality of spheres, each having the shoulder joint unit 250R or the wrist joint unit 270 of the robot 100 as the center thereof while having the length of the segment of the arm of the robot 100 as the radius thereof.

Although in the embodiments of the present disclosure, while controlling the motion of the robot in response to the motion of the user, the wrist joint of the robot is allowed to follow the wrist joint unit of the user for the mapping of the end position, the present disclosure is not limited thereto, the present disclosure is not limited thereto and thus the end position of the hand of the robot may be configured to follow the end position of the hand of the user, and other joints may be applied with the same scheme.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An apparatus of controlling a robot, the apparatus comprising:
    an image obtaining unit configured to obtain a three-dimensional image of a user;
    a driving unit configured to drive an arm of the robot that is composed of a plurality of segments; and
    a control unit configured to generate a user model that corresponds to a motion of the joint of the user based on the three-dimensional image, to generate a target model having the plurality of segments of which the length varies based on the user model, and to allow the arm of the robot to be driven based on the target model.

2. The apparatus of claim 1, wherein:
    the control unit is configured, at an initial position, to generate the target model such that the length of the segment of the target model is same as a length of the segment of the arm of the robot, and at a target position, to generate the target such that the length of the segment of the target model is same as a length of a segment of an arm of the user.

3. The apparatus of claim 2, wherein:
    the control unit is configured to generate the target model such that the length of the segment of the target model varies according to a distance from a present position to the target position.

4. The apparatus of claim 3, wherein:
    the control unit is configured to generate the target model such that the length of the segment of the target model varies according to a ratio of a remaining operation time to an entire operation time.

5. The apparatus of claim 4, wherein:
    the control unit is configured to allow a position of a wrist joint of the robot to follow a position of a wrist joint of the target model.

6. The apparatus of claim 5, wherein:
    the control unit is configured to allow an elbow joint of the robot to be positioned at lines of intersection of a plurality of spheres, the spheres each having a shoulder joint or the wrist joint of the robot as a center thereof while having the length of the segment of the arm of the robot as a radius thereof.

7. The apparatus of claim 6, wherein:
    the control unit is configured in a way that a first direction vector, which is aimed to an elbow joint of the target model from a central position of a circle that is formed by lines of intersection of a plurality of spheres, the spheres each having a position of a shoulder joint or a wrist joint of the target model as a center thereof while having the length of the segment of the target model as a radius thereof, is coincided with a second direction vector aimed to the elbow joint of the robot from a central position of a circle that is formed by the lines of intersection of the plurality of spheres, the spheres each having the shoulder joint or the wrist joint of the robot as the center thereof while having the length of the segment of the arm of the robot as the radius thereof.

8. A method of controlling a robot, the method comprising:
    obtaining by a processor a three-dimensional image of a user;
    generating by the processor a user model that corresponds to a motion of a joint of the user based on the three-dimensional image;
    generating by the processor a target model having a plurality of segments of which a length varies based on the user model; and
    driving an arm of the robot composed of a plurality of segments based on the target model.

9. The method of claim 8, wherein:
    the generating of the target model comprises generating, at an initial position, the target model such that the length of the segment of the target model is same as a length of the segment of the arm of the robot, and at a target position, generating the target model such that the length of the segment of the target model is same as a length of a segment of an arm of the user.

10. The method of claim 9, wherein:
    the generating of the target model comprises generating the target model such that the length of the segment of the target model varies according to a distance from a present position to the target position.

11. The method of claim 10, wherein:
    the generating of the target model comprises generating the target model such that the length of the segment of the target model to varies according to a ratio of a remaining operation time to an entire operation time.

12. The method of claim 11, wherein:
    the driving of the arm of the robot comprises allowing a position of a wrist joint of the robot to follow a position of a wrist joint of the target model.

13. The method of claim 12, further comprising:
    determining a position of an elbow joint of the robot that is provided at lines of intersection of a plurality of spheres, the spheres each having a shoulder joint or the wrist joint of the robot as a center thereof while having the length of the segment of the arm of the robot as a radius thereof.

14. The method of claim 13, wherein:
    the determining of the position of the elbow joint of the robot comprises allowing a first direction vector, which is aimed to an elbow joint of the target model from a central position of a circle that is formed by lines of intersection of a plurality of spheres, the spheres each having a position of a shoulder joint or a wrist joint of the target model as a center thereof while having the length of the segment of the target model as a radius thereof, to be coincided with a second direction vector aimed to the elbow joint of the robot from a central position of a circle that is formed by the lines of intersection of the plurality of spheres, the spheres each having the shoulder joint or the wrist joint of the robot as the center thereof while having the length of the segment of the arm of the robot as the radius thereof.

15. A control method of a robot, the control method comprising:
    obtaining by a processor a three-dimensional image of a user;
    generating by the processor a user model based on the three-dimensional image;
    generating by the processor a target model having a plurality of segments of which a length varies based on the user model; and
    driving a plurality of segments of the robot based on the target model.

16. The control method of claim 15, wherein the generating of the target model comprises generating the target model such that the length of the plurality of segments of the target model varies according to a distance from a present position to a target position.

17. The control method of claim 16, wherein the generating of the target model comprises generating the target model such that the length of the plurality of segments of the target model varies according to a ratio of a remaining operation time to an entire operation time.

18. The control method of claim 17, further comprising determining a position of a joint between the plurality of segments of the robot that is provided at lines of intersection of a plurality of spheres, the spheres each having an adjacent joint as a center thereof while having the length of the plurality of segments of the robot as a radius thereof.

19. The method of claim 18, wherein the determining of the position of the joint between the plurality of segments of the robot comprises allowing a first direction vector, which is aimed to a joint between the plurality of segments of the target model from a central position of a circle that is formed by lines of intersection of a plurality of spheres, the spheres each having a position of an adjacent joint of the target model as a center thereof while having the length of the plurality of segments of the target model as a radius thereof, to be coincided with a second direction vector aimed to the joint between the plurality of segments of the robot from a central position of a circle that is formed by the lines of intersection of the plurality of spheres, the spheres each having the adjacent joint of the robot as the center thereof while having the length of the segment of the robot as the radius thereof.

* * * * *